(12) United States Patent
Edling et al.

(10) Patent No.: US 11,423,784 B2
(45) Date of Patent: Aug. 23, 2022

(54) METHOD FOR CONTROLLING A PARKING OPERATION OF A MOTOR VEHICLE

(71) Applicant: Continental Automotive GmbH, Hannover (DE)

(72) Inventors: Frank Edling, Schwalbach (DE); Tobias Kranz, Karlstein a.M. (DE); Robert Obermaier, Hemau-Hohenschambach (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 75 days.

(21) Appl. No.: 16/758,194

(22) PCT Filed: Oct. 29, 2018

(86) PCT No.: PCT/DE2018/200098
§ 371 (c)(1),
(2) Date: Apr. 22, 2020

(87) PCT Pub. No.: WO2019/096357
PCT Pub. Date: May 23, 2019

(65) Prior Publication Data
US 2020/0324816 A1     Oct. 15, 2020

(30) Foreign Application Priority Data
Nov. 14, 2017    (DE) ............ 10 2017 220 247.5

(51) Int. Cl.
*G08G 1/16*     (2006.01)
*B62D 15/02*    (2006.01)
*G05D 1/02*     (2020.01)

(52) U.S. Cl.
CPC ............ *G08G 1/168* (2013.01); *G08G 1/166* (2013.01); *B62D 15/0285* (2013.01); *G05D 1/02* (2013.01)

(58) Field of Classification Search
CPC .... B62D 15/0285; G08G 1/166; G08G 1/168; G08G 1/14; G08G 1/143; G08G 1/16;
(Continued)

(56) References Cited

U.S. PATENT DOCUMENTS 9,761,070 B2    9/2017  Juzswik
2016/0264137 A1* 9/2016  Lavoie .............. B60W 30/16
(Continued)

FOREIGN PATENT DOCUMENTS

CA    3002633 A1      4/2017
DE    102009051463    5/2011
(Continued)

OTHER PUBLICATIONS

PCT Examiner Alban Ducher, English translation of the International Search Report of the International Searching Authority for International Application PCT/DE2018/200098, dated Jan. 25, 2019, 2 pages, European Patent Office, HV Rijswijk, Netherlands.
(Continued)

*Primary Examiner* — Van T Trieu
(74) *Attorney, Agent, or Firm* — RatnerPrestia

(57) ABSTRACT

A method of controlling a parking operation of a vehicle by a parking assistance system involves:
  capturing the position of a vehicle user located close to but outside of the vehicle;
  determining a provisional target position and a provisional motion path for the vehicle based on a vehicle starting position and the position of the vehicle user;
  checking whether the provisional target position and/or the motion of the vehicle into the provisional target position along the provisional motion path would cause a collision with the vehicle user; and
  if a result of the checking is affirmative, then changing the provisional target position and/or the provisional
(Continued)

motion path so that no collision with the vehicle user will occur at the changed target position and/or along the changed motion path.

17 Claims, 6 Drawing Sheets

(58) Field of Classification Search
CPC ...... G08G 1/167; B60W 30/00; B60W 30/06; B60W 50/14; G05D 1/00; G05D 1/02
See application file for complete search history.

(56) References Cited

U.S. PATENT DOCUMENTS

| | | | |
|---|---|---|---|
| 2017/0253237 A1* | 9/2017 | Diessner | B60W 30/06 |
| 2018/0136666 A1* | 5/2018 | Max | G08G 1/0112 |
| 2020/0226926 A1* | 7/2020 | Suzuki | G08G 1/168 |

FOREIGN PATENT DOCUMENTS

| | | | |
|---|---|---|---|
| DE | 102012200725 | | 7/2013 |
| DE | 102012022087 | | 5/2014 |
| DE | 112013002651 | | 2/2015 |
| DE | 102014210043 | | 10/2015 |
| DE | 102014014242 | | 3/2016 |
| EP | 3 364 264 | | 8/2018 |
| JP | 2017-7399 A | * | 1/2017 ............ B60R 21/00 |
| JP | 2017-007399 A | | 1/2017 |
| WO | WO 2006/064544 | | 6/2006 |

OTHER PUBLICATIONS

PCT Examiner Nora Lindner, PCT International Preliminary Report on Patentability including English Translation of PCT Written Opinion of the International Searching Authority for International Application PCT/DE2018/200098, dated May 19, 2020, 9 pages, International Bureau of WIPO, Geneva, Switzerland.

German Examiner Almut Gille, German Search Report for German Patent Application No. 10 2017 220 247.5, dated Jul. 20, 2018, 7 pages, German Patent and Trademark Office, Muenchen, Germany, with partial English translation, 5 pages.

Chinese Office Action for Chinese Application No. 201880073427.0, dated Apr. 21, 2022 with translation, 13 pages.

* cited by examiner

METHOD FOR CONTROLLING A PARKING OPERATION OF A MOTOR VEHICLE

FIELD OF THE INVENTION

The invention relates to a method for controlling a parking operation, taking account of the position of the vehicle user.

BACKGROUND INFORMATION

Parking assistance systems for vehicles, by means of which parking operations can be performed in an automated manner or respectively in a partly automated manner, are known from the prior art. Such parking operations can, for example, be operations involving parking in or leaving a parking space. Different parking situations can occur during this, for example parallel parking situations in which the vehicle is maneuvered into or respectively out of a parking space parallel or substantially parallel to the roadway, or perpendicular or respectively diagonal parking situations in which the vehicle is parked in or leaves a parking space aligned transversely to the roadway.

The disadvantage of the known parking assistance systems is that, in the event that the vehicle user is not located inside the vehicle but outside, and the parking assistance system maneuvers the vehicle in a virtually remote-controlled manner into or respectively out of the parking space, the position of the vehicle user is not taken account of. As a result, it can happen that the vehicle user is himself in the vehicle motion path or respectively is located at the target position into which the vehicle is to be moved by means of the parking assistance system. This problem occurs in particular as a result of the vehicle user not knowing the vehicle motion path proposed by the parking assistance system or respectively the vehicle target position. This can lead to the vehicle having to initiate emergency braking during the parking operation in order to avoid a collision with the vehicle user, and the vehicle user thereafter has to alter his position. Such situations are perceived by vehicle users to be threatening and awkward.

SUMMARY OF THE INVENTION

Starting from this, it is an object of the invention to indicate a method for controlling a parking operation, which makes possible an improved parking operation on the basis of the location information of the vehicle user.

The object can be achieved by a method and by a vehicle with a parking assistance system, respectively having features of the invention as set forth herein.

According to a first aspect, the invention relates to a method for controlling a parking operation of a vehicle by means of a parking assistance system.

The method comprises the following steps:

The position of a vehicle user who is located close to but outside of the vehicle is first captured. This can be effected by means of technologies known from the prior art, for example by capturing the position of the vehicle key, a mobile terminal (mobile phone, smartphone, tablet PC, etc.) of the vehicle user or also by other sensor technologies, for example cameras, radar systems, thermal imaging systems, inter-vehicle communication installed on the vehicle, etc.

A provisional vehicle target position and a provisional vehicle motion path are subsequently established on the basis of the vehicle starting position and the position of the vehicle user.

Following the fixing of the provisional vehicle target position and a provisional vehicle motion path, it is examined if the provisional vehicle target position and/or the motion of the vehicle into the provisional vehicle target position on the provisional vehicle motion path causes a collision with the vehicle user.

If a collision with the vehicle user occurs at the provisional vehicle target position or during the motion of the vehicle into the provisional vehicle target position, the provisional vehicle target position is changed into a changed vehicle target position and/or the provisional vehicle motion path is changed into a changed vehicle motion path. The changed vehicle target position and/or the changed vehicle motion path are selected in such a way that no collision with the vehicle user occurs at the changed vehicle target position and/or during the motion of the vehicle on the changed vehicle motion path. This can either be effected by simply modifying the vehicle target position or respectively vehicle motion path or also, if necessary, by altering a position of the vehicle user if, for example, the parking operation cannot be performed without this.

It is understood that the previously indicated steps can take place in a loop, in particular an endless loop, until the parking operation is completed, i.e. the vehicle has been moved into the (originally selected or changed) vehicle target position. In other words, collisions with the vehicle user are therefore checked until such time as the parking operation has been completed. As a result, if the vehicle user moves during the parking operation this alteration in position is also captured, and the parking operation (vehicle target position, vehicle motion path) can, if necessary, be planned again, taking account of the new location of the vehicle user.

The vehicle motion path can be composed of multiple moves, for example a combination of one or more forward and backward moves.

The major advantage of the method according to the invention is that the parking operation can be planned in an improved way, taking account of the position of the vehicle user, and can be executed more safely and more efficiently for the vehicle user.

According to an exemplary embodiment, a signal is emitted at the vehicle and/or hint information is transmitted to a device which is associated with the vehicle user which informs the vehicle user that the latter must change his current position in order to make possible a parking operation, if no changed vehicle target position and/or no changed vehicle motion path can be established, which does not cause a collision with the vehicle user. As a result, the vehicle user can already be informed early on (without motion of the vehicle towards the latter and, if necessary, an initiated emergency braking) that he has to change his location in order to make the parking operation possible. The hint information can be visual or audible information. In particular, the hint information can inform the is vehicle user in which direction and/or how far the latter has to move in order to be able to perform the parking operation.

According to an exemplary embodiment, the step of changing the provisional vehicle target position into a changed vehicle target position comprises changing the provisional vehicle target position into at least one, preferably into two, different spatial direction(s). As a result, no collision with the vehicle user occurs at the changed vehicle target position.

According to an exemplary embodiment, the provisional vehicle target position or the changed vehicle target position is adjusted in such a way that, following the motion of the vehicle into the vehicle target position, the position of the driver's door is located in a close spatial relationship with the position of the vehicle user, preferably at a distance of less than 2 m, in particular less than 1 m. This makes it easier for the vehicle user to get into the vehicle since the vehicle door is, for example, positioned within the latter's reach.

According to an exemplary embodiment, the provisional or changed vehicle target position is adjusted, taking account of the parking trajectory on which the vehicle is moved during the parking operation. In particular, the provisional or respectively changed vehicle target position is selected in such a way that this can be achieved without any maneuvering or with only a little maneuvering. This can effectively avoid awkward parking maneuvers.

According to an exemplary embodiment, the position of the vehicle user is monitored during the parking operation. As a result, alterations in position effected by the vehicle user can be identified during the parking operation. In the event that there is a risk of collision due to these alterations in position, the parking operation can be interrupted and the vehicle user can be prompted to alter his position.

According to an exemplary embodiment, the speed of the vehicle is adjusted, in particular reduced, during the parking operation as a function of the distance between the vehicle and the vehicle user. As a result, the risk of collision can be further reduced and the vehicle user's feeling of safety can be increased.

According to an exemplary embodiment, visual information regarding in which direction and/or how far the vehicle user should move is displayed on a device associated with the vehicle user. This is in particular the case if the collision situation cannot be nullified by an altered vehicle target position or respectively altered vehicle motion path. As a result, the user friendliness of the parking assistance system is substantially increased. According to an exemplary embodiment, at least two provisional vehicle target positions are determined and the vehicle user makes a selection regarding a provisional vehicle target position to be used on a device associated with him. As a result, an advantageous vehicle target position can be found for the vehicle user by means of user interaction.

According to an exemplary embodiment, a preferred provisional vehicle target position is graphically highlighted and, for example, provisionally selected on the device. As a result, the vehicle user can be offered support during the selection of the provisional vehicle target position.

According to an exemplary embodiment, the position of the vehicle user is captured by establishing the position of a device associated with the vehicle user, in particular a vehicle key, a vehicle operating card or a mobile telecommunication device. Said device can equally be utilized as a user interface for inputting information, on the basis of which the parking operation is influenced.

According to an exemplary embodiment, the parking assistance system captures parking situations in which the vehicle user can no longer leave the parking space after the parking position is taken up. This is possible by means of sensor technology and data processing means known from the prior art. In this case, the parking operation can for example be interrupted prior to driving into the parking space and the vehicle user can be prompted to leave the parking space.

According to another aspect, the invention relates to a vehicle comprising a parking assistance system, first sensor technology for capturing surroundings information and second sensor technology for capturing the position of a device associated with the vehicle user. In addition, at least one control unit for controlling the parking assistance system is provided. Said control unit is configured to carry out the following steps of:

capturing the position of a vehicle user who is located close to but outside of the vehicle;

determining a provisional vehicle target position and a provisional vehicle motion path on the basis of a vehicle starting position and the position of the vehicle user;

checking if the provisional vehicle target position and/or the motion of the vehicle into the provisional vehicle target position on the provisional vehicle motion path causes a collision with the vehicle user;

changing the provisional vehicle target position into a changed vehicle target position and/or changing the provisional vehicle motion path into a changed vehicle motion path if a collision with the vehicle user occurs at the provisional vehicle target position or during the motion of the vehicle into the provisional vehicle target position, the changed vehicle target position and/or the changed vehicle motion path being selected in such a way that no collision with the vehicle user occurs at the changed vehicle target position and/or during the motion of the vehicle on the changed vehicle motion path.

The term "parking operation" is used within the meaning of the present invention to denote any motions of the vehicle to take up a parking position or to move out of a parking position, that is to say in particular operations involving parking in and leaving a parking space.

The term "device" is used within the meaning of the present invention to denote any unit which can be associated with the vehicle user, in particular which the latter can take with him and the geographical position of which can be captured by suitable sensor technology. Such devices can, for example, be vehicle keys, vehicle cards, mobile phones, smartphones, tablet PCs, laptops or other portable units, in particular telecommunication devices.

The term "collision" is used within the meaning of the present invention to denote both an actual collision, i.e. the vehicle touches the vehicle user or respectively would move across the latter's location. In addition, those cases in which no direct contact actually occurs with the vehicle user, but the vehicle comes close (for example closer than 20 cm, in particular less than 15 cm, 10 cm or 5 cm) to the vehicle user in such a way that the latter would feel threatened by the parking maneuver, can also be construed to be a "collision".

The expressions "approximately", "substantially" or "roughly" within the meaning of the invention mean deviations from the precise value in each case of +/−10%, preferably of +/−5% and/or deviations in the form of alterations which are not important for the function.

Further developments, advantages and possible applications of the invention are also set out by the following description of exemplary embodiments and by the figures. All of the features described and/or pictured, whether alone or in any combination, essentially form the subject-matter of the invention, independently of the summary thereof in the claims or references back thereto. The content of the claims is also made an integral part of the description.

BRIEF DESCRIPTION OF THE DRAWINGS

The invention is explained in greater detail below by means of exemplary embodiments with reference to the figures, wherein.

DETAILED DESCRIPTION OF EXAMPLE EMBODIMENTS OF THE INVENTION

Figure 1:
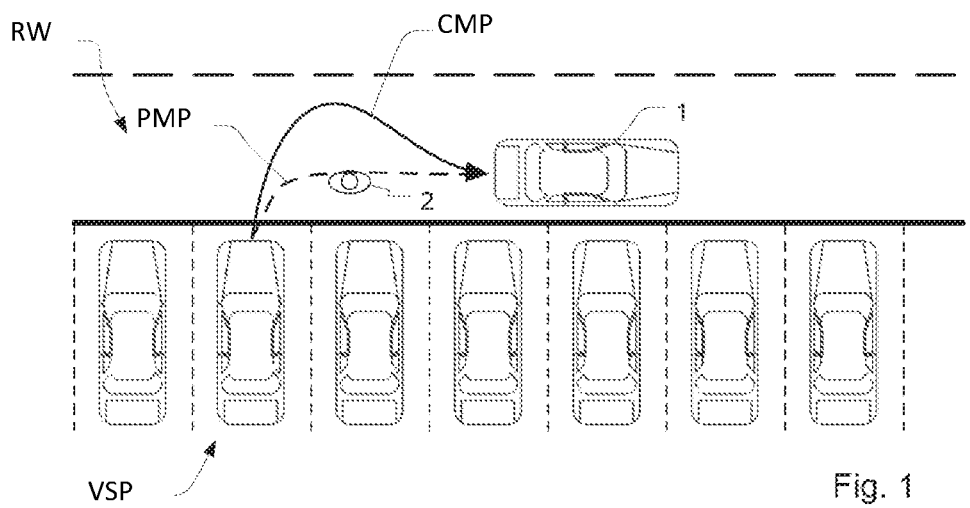
FIG. 1 shows, by way of example and schematically, a situation involving leaving a parking space in which the vehicle motion path is altered based on the position of the vehicle user.
Figure 2:
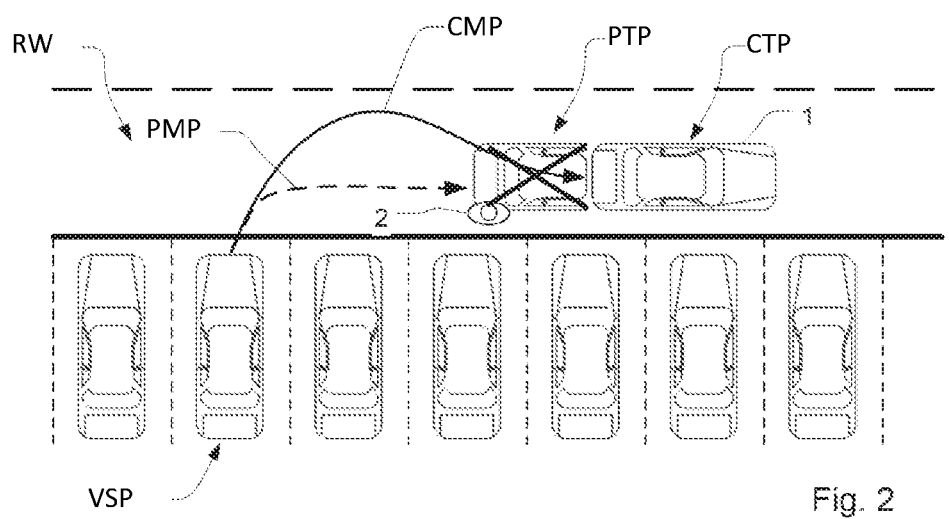
FIG. 2 shows, by way of example and schematically, a situation involving leaving a parking space in which the vehicle motion path and the vehicle target position are altered based on the position of the vehicle user.
Figure 3:
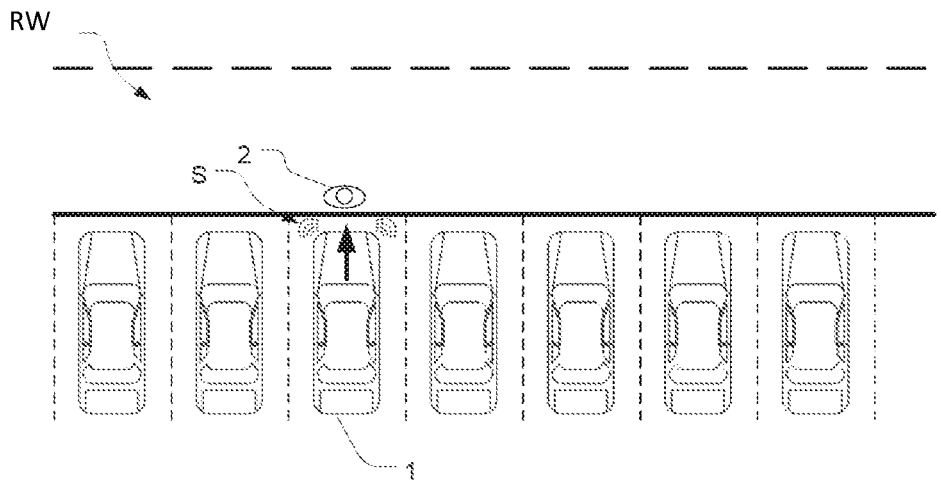
FIG. 3 shows, by way of example and schematically, a situation involving leaving a parking space in which it is not possible to leave the parking space based on the position of the vehicle user and therefore a signal is emitted by the vehicle.

FIGS. 1 to 3 show, by way of example and schematically, parking scenarios in which a parking operation of a vehicle 1 is controlled by means of a parking assistance system. In each case, said parking scenarios relate to situations involving leaving a sparking space, in which the vehicle 1 is located in the parking space perpendicular to the roadway RW. It is understood that the invention can also be applied to parking scenarios in which the vehicle 1 is located in a parking space parallel or substantially parallel or respectively diagonal to the roadway RW.

Irrespective of the respective parking scenario, it is possible thanks to the parking assistance system of the vehicle 1 for an operation involving parking in a parking space or respectively an operation involving leaving a parking space to be controlled remotely by a vehicle user 2 using a device 3. During this, the vehicle user 2 and the device 3 associated with him are not located in the interior of the vehicle 1 but the vehicle user 2 and the device 3 are located in spatial proximity to the vehicle 1, for example at a distance of less than 10 m, in particular less than 6 m.

The device 3 can be coupled to the vehicle 1 by means of common wireless communication links so that at least a unidirectional, preferably a bidirectional data transfer, can be effected between the device 3 and the vehicle 1. The wireless communication link can use the following transfer methods, for example: Bluetooth, WLAN, ZigBee, NFC, Wibree or WiMAX. Alternatively, an optical communication link can in principle also conceivable.

The device 3 can, for example, be formed by a vehicle key, a telecommunication device, for example a mobile phone, smartphone, tablet, laptop, etc. In cases where telecommunication devices are used, these preferably have an application (APP), via which the data are exchanged with the vehicle 1, in particular the parking assistance system of the vehicle 1.

Figure 4:
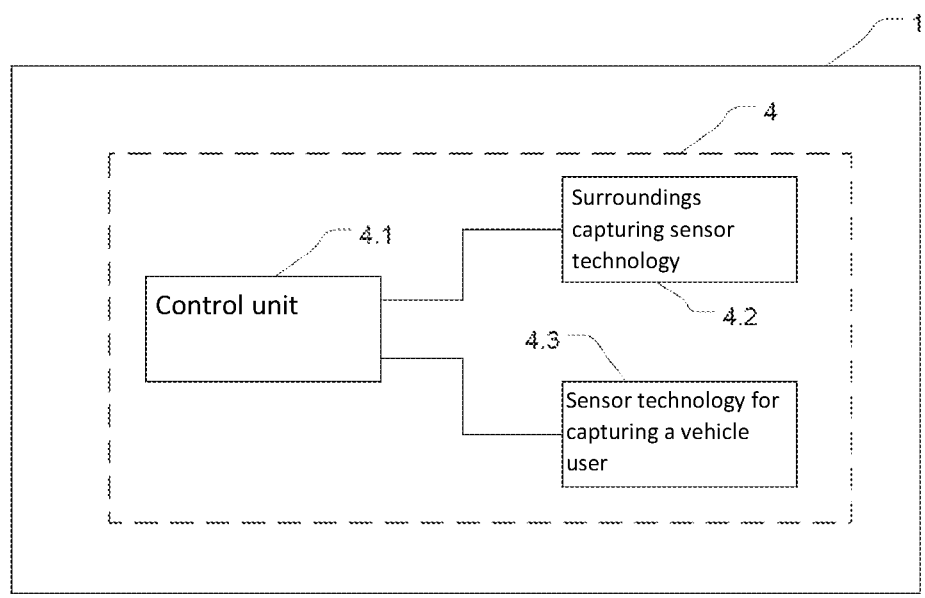
FIG. 4 shows, by way of example and schematically, a block diagram of a vehicle having a parking assistance system.

FIG. 4 shows a schematic block wiring diagram of a vehicle 1 having a parking assistance system 4. The parking assistance system 4 has, in the known way, a control unit 4.1, by means of which the parking assistance functions are controlled. In addition, surroundings capturing sensor technology 4.2 is provided, by means of which objects located in the spatial surroundings of the vehicle 1 can be captured. Such objects can, for example, be other parked vehicles, buildings, curbstones etc. The surroundings capturing sensor technology 4.2 can, in particular, comprise one or more cameras, ultrasonic sensors, at least one radar sensor, etc.

The surroundings capturing sensor technology 4.2 is coupled to the control unit 4.1. As a result, the information captured by the surroundings capturing sensor technology 4.2 can be transferred to the control unit 4.1 such that the latter can detect free parking spaces therefrom.

In addition, the vehicle 1 has sensor technology 4.3 for capturing the location of the vehicle user 2 and indeed preferably via the device 3 associated with him, i.e. located in the latter's spatial proximity. In particular, the sensor technology 4.3 can be configured to capture the local position of the vehicle key or of a telecommunication device of the vehicle user 2 known to the vehicle 1, in order to conclude therefrom at which local position the vehicle user 2 is located.

The sensor technology 4.3 is likewise coupled to the control unit 4.1 such that the control unit 4.1 can capture in which relative position the vehicle user 2 is located with respect to the parking space, the vehicle target position striven for by the parking assistance function following the completion of the parking operation, or respectively the motion path (trajectory) of the vehicle 1 utilized during the parking operation. For example, a surroundings map of the region around the vehicle 1 can be drawn up by the control unit 4.1, wherein the vehicle user 2 is included in said surroundings map.

An operation involving leaving a parking space is, for example, schematically represented in FIG. 1. A vehicle 1 is to be made to leave a parking space which is aligned perpendicular to the roadway RW, in a remote-controlled manner by the user 2 who is located in the environment of the vehicle 1. The vehicle is to be moved from a vehicle starting position VSP by being moved on a vehicle motion path to a vehicle target position at which the vehicle 1 is located at the end of the operation involving leaving the parking space.

As indicated in FIG. 1, during the motion from the vehicle starting position VSP to the vehicle target position, the vehicle 1 would move on a vehicle motion path on which the vehicle user 2 is located. This would occasion a collision with the vehicle user 2.

The term "vehicle motion path" is used below to denote both a single-move vehicle motion path and a multiple-move vehicle motion path, i.e. a vehicle motion path which consists of multiple forward and/or backward moves.

FIG. 2 shows another exemplary embodiment in which a vehicle target position has been selected by means of the parking assistance system 4, at which target position a collision with the vehicle user 2 takes place, i.e. the vehicle user 2 is located at the vehicle target position.

Figure 5:
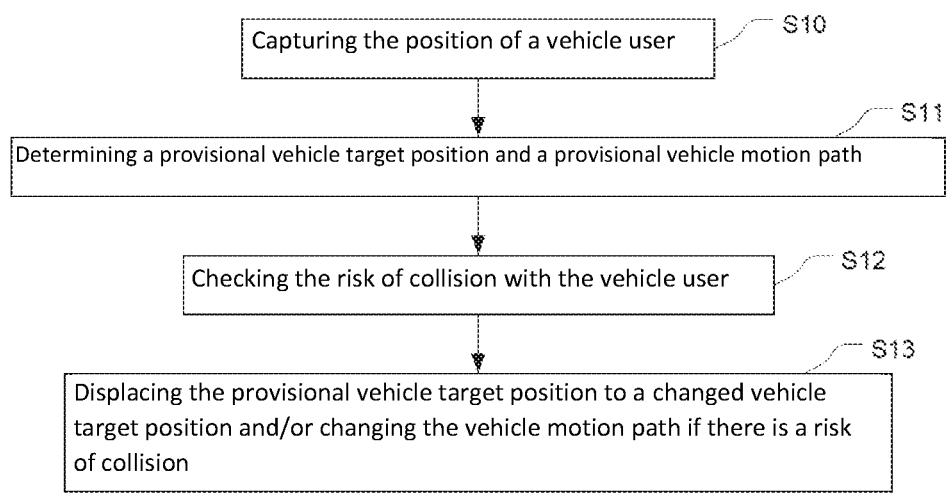
FIG. 5 shows, by way of example, a flow chart illustrating the method for controlling the parking operation.

In order to avoid a collision with the vehicle user 2, the parking assistance system 4 can be configured to execute a collision avoiding method according to the flow chart shown in FIG. 5.

First of all, the position of the vehicle user 2 who is located outside of the vehicle 1 but in a close local relationship to the vehicle 1 is captured (S10).

A provisional vehicle target position PTP and a provisional vehicle motion path PMP are subsequently determined by means of the parking assistance system 4 (S11). The provisional vehicle target position PTP can either be fixed by means of the parking assistance system 4 alone or by integrating the vehicle user 2, in particular by the parking assistance system 4 interacting with the vehicle user 2 via the device 3.

After fixing the provisional vehicle target position PTP, the parking assistance system 4 checks if there is a risk of collision with the vehicle user 2 (S12). The risk of collision check can in particular include a check to establish whether the vehicle user 2 is located at the provisional vehicle target position PTP and/or whether the provisional vehicle motion path PMP intersects with the position of the vehicle user 2, i.e. the provisional vehicle motion path PMP runs across the position of the vehicle user 2.

In the event that the risk of collision check identifies a collision situation, the provisional vehicle target position PTP is changed to a changed vehicle target position CTP, i.e. the target position of the vehicle 1 to be taken up after the parking operation is displaced in such a way that a collision with the vehicle user 2 no longer occurs at the changed vehicle target position CTP. Alternatively or additionally, the provisional vehicle motion path PMP can also be changed into a changed vehicle motion path CMP by means of the parking assistance system 4 (FIG. 2) such that a collision no longer occurs with the vehicle user 2 on this changed vehicle motion path CMP (S13).

The previously indicated steps can be worked through in a single run-through. Alternatively, the steps can take place in a loop, in particular an endless loop, until the parking operation is completed, i.e. the vehicle has been moved into the vehicle target position.

Figure 6:
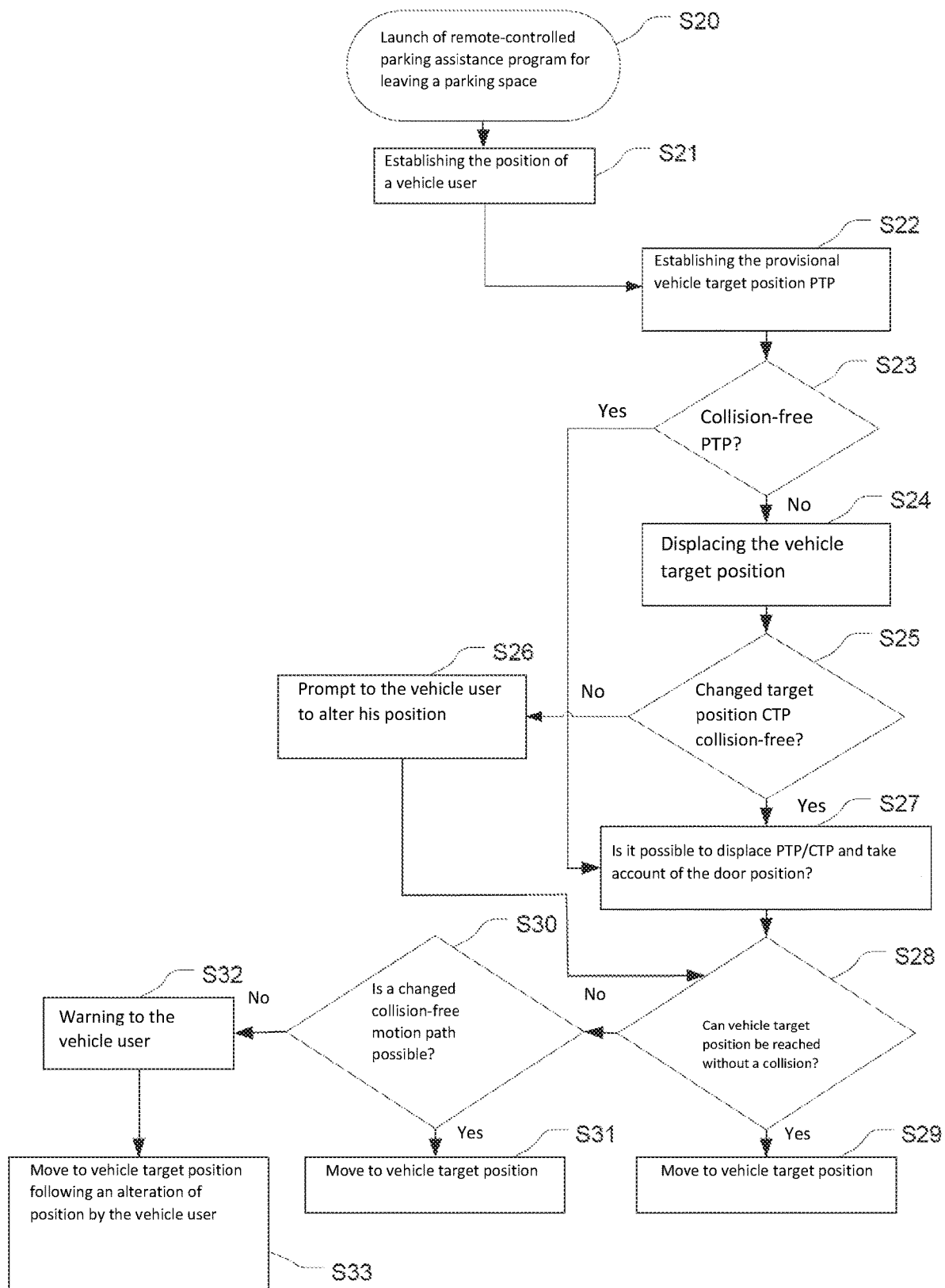
FIG. 6 shows, by way of example, a flow chart in order to illustrate the processes during an operation involving leaving a parking space, which is at least supported by the parking assistance system.

FIG. 6 shows an exemplary embodiment of a collision avoiding method during an operation involving leaving a parking space supported by the parking assistance program.

The remote-controlled operation involving leaving a parking space supported by the parking assistance system is first started (S20). The vehicle user is preferably already located outside of the vehicle during this. The launch of the automatic operation involving leaving a parking space can be started, for example, with the aid of a device associated with the vehicle user, for example a smartphone or the vehicle key.

Following the launch of the automatic operation involving leaving a parking space, the location of the vehicle user is first established (S21). The location of the vehicle user is preferably established by means of locating the position of the device associated with him. Said locating can be effected by means of any of the locating methods which are known from the prior art and which are suitable for this purpose. As a result, the parking assistance program can take account of the location of the vehicle user during the determination of the vehicle target position and the motion to said vehicle target position.

Figure 9:
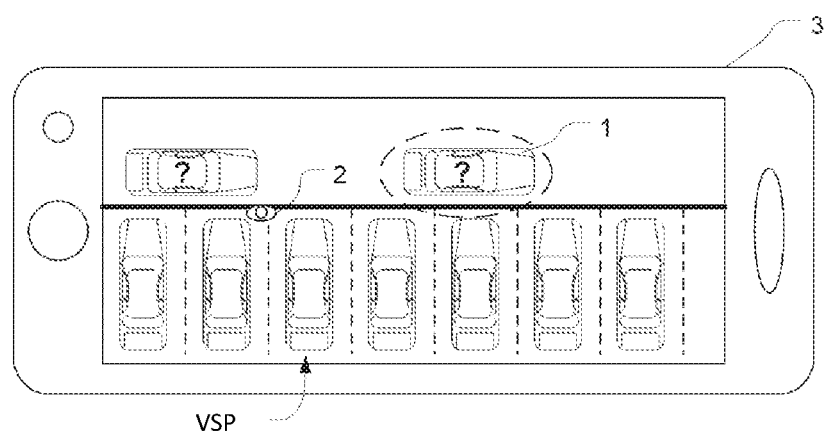
FIG. 9 shows, by way of example, a device having a graphical user interface on which possible selections for fixing the vehicle target position are displayed.

The provisional vehicle target position PTP is subsequently established by means of the parking assistance system (S22). This can either be automatically effected exclusively by means of the parking assistance system (without the action of the vehicle user 2) or can be at least partially influenced by the vehicle user 2 (partially automated). For example, as shown in FIG. 9, multiple possible provisional vehicle target positions PTP can be displayed on the device 3 and the vehicle user 2 can make a selection regarding which of these vehicle target positions he prefers. For example, one of the vehicle target positions (as indicated in FIG. 9 by the dashed oval) can also be highlighted in order to signal to the vehicle user 2 which vehicle target position is regarded by the parking assistance system as the preferred one. The provisional vehicle target position PTP can be chosen depending on whether the parking situation in question involves leaving a parallel parking space (vehicle longitudinal axis is aligned parallel or substantially parallel to the roadway RW), or whether it involves a perpendicular parking position (vehicle longitudinal axis is aligned perpendicular or substantially perpendicular to the roadway RW).

Following the establishment of the provisional vehicle target position PTP it is examined if a collision with the vehicle user 2 exists at the provisional vehicle target position PTP (S23), i.e. the vehicle user 2 is located at the position which the parking assistance system has established as the provisional vehicle target position PTP. If the provisional vehicle target position PTP does not collide with the position of the vehicle user 2, the method is continued at step S27.

If a collision between the position of the vehicle user 2 and the provisional vehicle target position PTP exists (see FIG. 2), an attempt is made to find a changed target position at which no collision situation exists. In other words, an attempt is therefore made to relocate or respectively to displace the provisional vehicle target position PTP to a changed vehicle target position CTP at which no collision with the vehicle user 2 exists. This changed vehicle target position CTP can, in particular, be obtained by displacing the provisional vehicle target position PTP along at least one spatial direction (for example along the longitudinal direction of the roadway RW or transversely to the longitudinal direction of the roadway RW), preferably along at least two spatial directions running orthogonally to one another (for example along the longitudinal direction of the roadway RW and perpendicular to the longitudinal direction of the roadway RW).

Following this relocation/displacement, it is examined if no collision with the vehicle user exists at the changed vehicle target position CTP (S25). The steps S24 and S25 can be run through several times in a row so that multiple different changed vehicle target positions CTP can be examined with respect to the risk of collision with the vehicle user 2. In the event that no collision-free vehicle target position can be found, the vehicle user is prompted to alter his current position or respectively his location (S26). This can either be effected by audible or visual signals which are emitted by the vehicle 1 itself or by the device 3. For example, it can be indicated by the device 3 where or respectively in which direction the vehicle user 2 should move. This indication of the alteration in position can in particular take account of which position of the vehicle user 2 is advantageous, in order to achieve a collision-free motion of the vehicle 1 to a desired vehicle target position (provisional vehicle target position PTP or changed vehicle target position CTP).

In a preferred, but optional embodiment, it can be examined if the provisional vehicle target position PTP or respectively changed vehicle target position CTP can be displaced in such a way that it is made possible for the vehicle user 2 to get into the vehicle 1 more easily (S27). It is preferably examined if the vehicle target position of the vehicle 1 can be chosen in such a way that the vehicle door on the driver's side is aligned with the location of the vehicle user. For example, an attempt is made to choose the vehicle target position in such a way that the door handle of the vehicle door is arranged within reach of the vehicle user (for example, within a radius of less than 1 m, in particular less than 0.5 m). Following step S27, the final vehicle target position is fixed. This can either be the provisional vehicle target position PTP, the changed vehicle target position CTP (following displacement in order to prevent a collision) or a vehicle target position aligned with the vehicle user entry position.

It is subsequently examined if said final vehicle target position can be reached without a collision by means of a standard trajectory for leaving a parking space (provisional vehicle motion path PMP) which is usually used in said parking situation (S28). In the event that there is no risk of a collision on the standard trajectory for leaving a parking space, the vehicle 1 is moved to said final vehicle target position by using the standard trajectory for leaving a parking space (S29). This can either take place directly or following an input (e.g. "Start parking operation") by the vehicle user 2 at the device 3. The position of the vehicle user 2 is monitored in order to ensure that the latter does not move into the planned vehicle motion path. In the event that the latter does move into the vehicle motion path, the operation involving leaving the parking space is interrupted or respectively a warning signal is emitted by the vehicle 1.

In the event that the standard trajectory for leaving a parking space causes a collision with the vehicle user 2 (see FIG. 1), it is examined if it possible to move the vehicle on a changed vehicle motion path CMP on which no collision with the vehicle user 2 occurs (S30).

If such a changed vehicle motion path CMP exists, the vehicle 1 is moved thereon into the final vehicle target position (S31). This can, in turn, be effected either directly or following an input (e.g. "Start parking operation") by the vehicle user 2 at the device 3. The position of the vehicle user 2 is monitored in order to ensure that the latter does not move into the planned vehicle motion path. In the event that the latter does move into the vehicle motion path, the operation involving leaving the parking space is either interrupted or respectively a warning signal is emitted by the vehicle 1 or, if a further change of the vehicle motion path is collision-free, this further changed path is used.

If no collision-free vehicle motion path exists, a vehicle motion path is chosen for the operation involving leaving the parking space, which does not take account of the position of the vehicle user 2. This can be, for example, a standard trajectory for leaving the parking space which can be applied during the respective parking situation.

In order to avoid a collision of the vehicle 1 with the vehicle user 2 on the vehicle motion path, a warning is emitted to the vehicle user 2 that the latter has to alter his position in order to make possible the operation involving leaving the parking space (S32). Said warning can, for example, be an audible warning or a warning by the vehicle itself. Alternatively or additionally, visual information, for example in the form of a map, can be displayed on the device 3, by means of which visual information the vehicle user is informed in which direction he has to move in order to make possible the parking operation.

After the user has changed his position, the vehicle 1 is finally moved to the final vehicle target position (S33). This can, in turn, either take place directly or following an input (e.g. "Start parking operation") by the vehicle user 2 at the device 3. The position of the vehicle user 2 is, in turn, monitored in order to ensure that the latter does not move into the planned vehicle motion path. In the event that the latter does move into the vehicle motion path, the operation involving leaving the parking space is either interrupted or respectively a warning signal is emitted by the vehicle 1 or, if a further change of the motion path is collision-free, this further changed path is used.

The collision check between the vehicle 1 and vehicle user 2 preferably runs until such time as the parking operation has been completed. As a result, if the vehicle user 2 moves during the parking operation, the vehicle motion path can be planned again, taking account of the location of the vehicle user 2. If, for example, the vehicle user 2 moves into the vehicle motion path when the vehicle 1 is reversing, the vehicle can be stopped in front of the vehicle user 2 and said premature stopping of the vehicle 1 can, for example, be compensated for by a greater steering angle during the next forward move.

Figure 7:
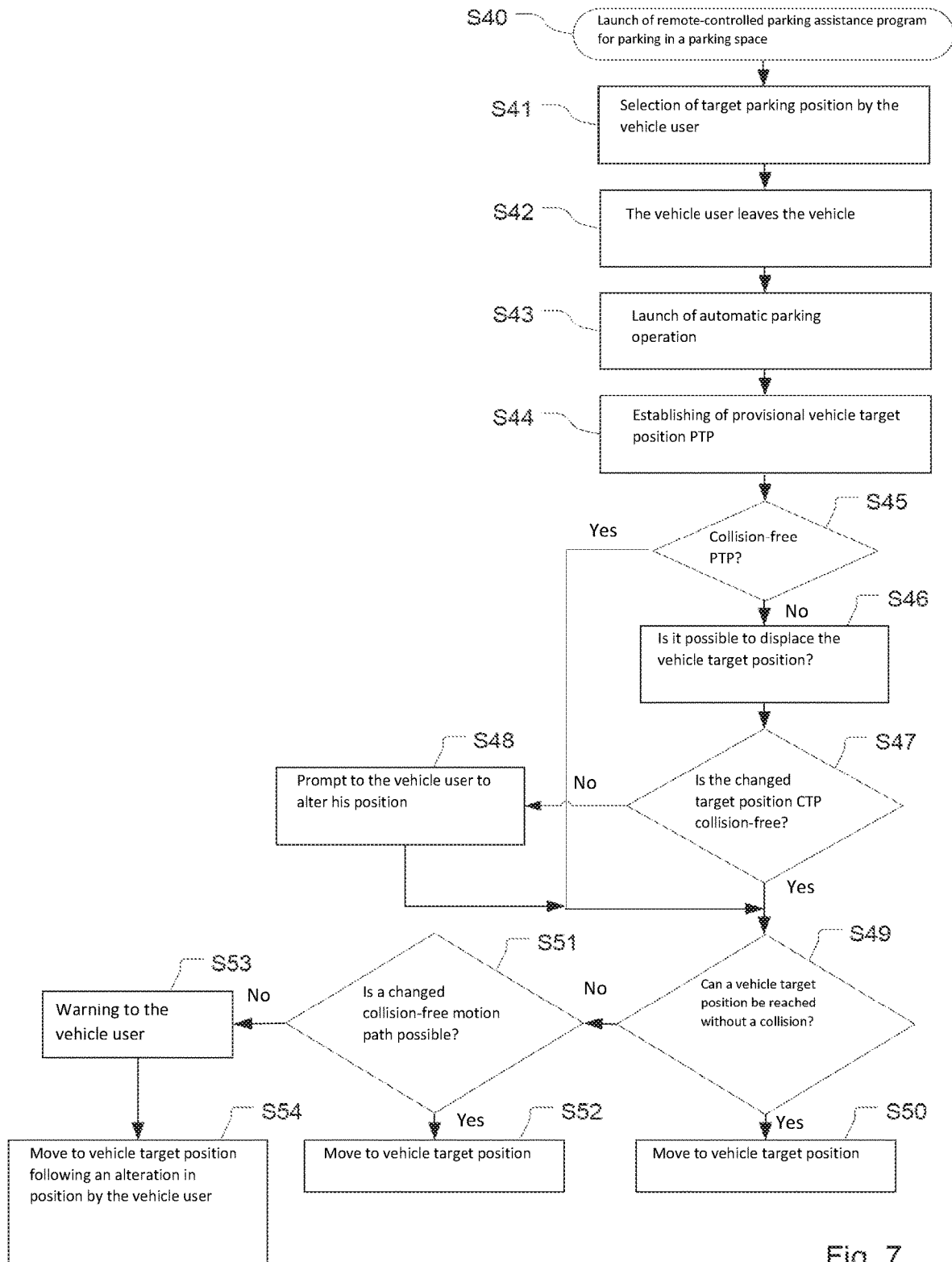
FIG. 7 shows, by way of example, a flow chart in order to illustrate the processes during an operation involving parking in a parking space, which is at least supported by the parking assistance system.
Figure 8:
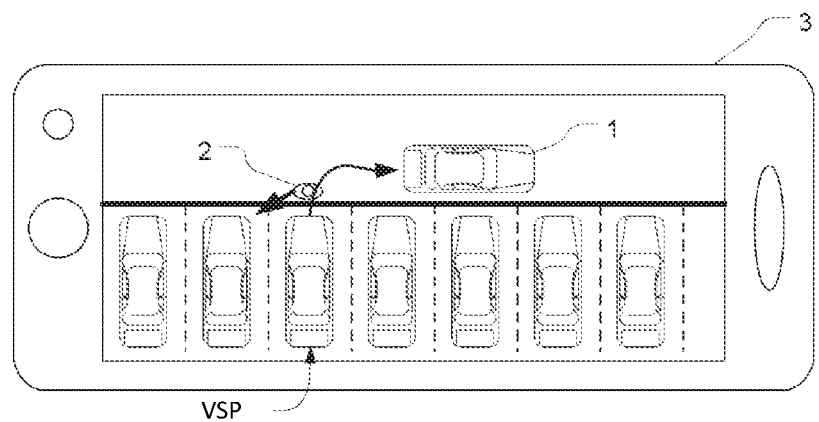
FIG. 8 shows, by way of example, a device having a graphical user interface on which a prompt to alter the position of the user is displayed.

FIG. 7 shows an exemplary embodiment of a collision avoiding method during an operation involving parking in a parking space which is supported by the parking assistance program. The remote-controlled parking assistance program carrying out the parking maneuver is first started in step S40. This can be effected, for example, by the device 3, for example the remote control of the vehicle 1 or respectively by a smartphone or similar.

A target parking position can subsequently be selected by the vehicle user 2, in which the vehicle 1 is to be located following the parking maneuver (S41). For example, multiple options of target parking positions can be indicated on a graphical user interface on the device 3, from which the vehicle user 2 can select a target parking position.

After the vehicle user 2 leaves the vehicle 1 (S42), the automatic parking operation is started (S43), i.e. the parking assistance system attempts to bring the vehicle 1 into the selected target parking position, taking account of the position of the vehicle user 2 who is located outside of the vehicle 1.

A provisional vehicle target position PTP is first established (S44). This can either be effected automatically exclusively by means of the parking assistance system (without the action of the vehicle user 2) or can at least be partially influenced by the vehicle user 2 (partially automated). The provisional vehicle target position PTP can be chosen depending on whether a parallel parking situation (vehicle longitudinal axis is aligned parallel or substantially parallel to the roadway RW) or a perpendicular parking position (vehicle longitudinal axis is aligned perpendicular or substantially perpendicular to the roadway RW) exists.

After the provisional vehicle target position PTP has been established, it is examined if a collision exists with the vehicle user 2 at the provisional vehicle target position PTP (S45), i.e. the vehicle user 2 is located at the position which the parking assistance system has established as the provisional vehicle target position PTP. If the provisional vehicle target position PTP does not collide with the position of the vehicle user 2, the method is continued at step S49.

If a collision between the position of the vehicle user 2 and the provisional vehicle target position PTP exists (vehicle user 2 located, for example, in the parking space), it is checked if it is possible to displace the target position (S46). In other words, an attempt is therefore made to relocate or respectively to displace the provisional vehicle target position PTP to a changed vehicle target position CTP. Said changed vehicle target position CTP can in particular be obtained by displacing the provisional vehicle target position PTP along at least one spatial direction (for example along the longitudinal direction of the roadway RW or transversely to the longitudinal direction of the roadway RW), preferably along at least two spatial directions running orthogonally to one another (for example along the longitudinal direction of the roadway RW and perpendicular to the longitudinal direction of the roadway RW).

Following this relocation/displacement, it is examined if no collision with the vehicle user exists (S47) at the changed vehicle target position CTP. The steps S46 and S47 can be run through several times in a row so that multiple different changed vehicle target positions CTP can be examined with respect to the risk of collision with the vehicle user 2. In the event that no collision-free vehicle target position can be found, the vehicle user is prompted to alter his current position or respectively his location (S48). This can either be effected by audible or visual signals which are emitted by the vehicle 1 itself or by the device 3. For example, it can be indicated by the device 3 where or respectively in which direction the vehicle user 2 should move. This indication of the alteration in position can in particular take account of which position of the vehicle user 2 is advantageous, in order to achieve a collision-free motion of the vehicle 1 to a desired vehicle target position (provisional vehicle target position PTP or changed vehicle target position CTP).

Following step S47 or respectively S48, a final vehicle target position is fixed, into which the vehicle 1 is to be brought during the parking maneuver. Said final vehicle target position can either be the provisional vehicle target position PTP which was established first or the changed vehicle target position CTP. In particular, the provisional vehicle target position PTP can then be fixed as the final vehicle target position if it is ascertained either in step S45 that said provisional vehicle target position PTP is collision-free or the vehicle user 2 has altered his position in step S48 in such a way that the provisional vehicle target position PTP originally causing a collision with the vehicle user 2 is now collision-free.

It is examined in step S49 if said final vehicle target position can be reached without a collision by means of a standard parking trajectory (provisional vehicle motion path PMP) which is usually used in said parking situation (S49). In other words, it is therefore examined if a parking motion path or respectively a parking trajectory fixed by means of the parking assistance system based on standard basic values (curve radius, number of parking moves, etc.) exists, on which the vehicle 1 can be maneuvered and on which no collision with the vehicle user 2 occurs.

In the event that no risk of collision exists on the standard parking trajectory, the vehicle 1 is moved to said final vehicle target position by using the standard parking trajectory (S50). This can either be effected directly or following an input (e.g. "Start parking operation") by the vehicle user 2 at the device 3. The position of the vehicle user 2 is monitored in order to ensure that the latter does not move into the planned vehicle motion path. In the event that the latter does move into the vehicle motion path, the parking maneuver is interrupted or respectively a warning signal is emitted by the vehicle 1.

In the event that the standard parking trajectory causes a collision with the vehicle user 2, it is examined if it is possible to move the vehicle on a changed vehicle motion path CMP, on which no collision with the vehicle user 2 occurs (S51).

If such a changed vehicle motion path CMP exists, the vehicle 1 is moved on this into the final vehicle target position (S52). This can, in turn, be effected either directly or following an input (e.g. "Start parking operation") by the vehicle user 2 at the device 3. The position of the vehicle user 2 is monitored in order to ensure that the latter does not move into the planned vehicle motion path. In the event that the latter does move into the vehicle motion path, the parking maneuver is interrupted or respectively a warning signal is emitted by the vehicle 1.

If no collision-free vehicle motion path exists, a vehicle motion path is chosen for the parking maneuver, which does not take account of the position of the vehicle user 2. This can be, for example, a standard parking trajectory which can be applied during the respective parking situation.

In order to avoid a collision of the vehicle 1 with the vehicle user 2 on the vehicle motion path, a warning is emitted to the vehicle user 2 that the latter has to alter his position in order to make possible the parking maneuver (S53). Said warning can, for example, be an audible warning or warning by the vehicle 1 itself. Alternatively or additionally, visual information, for example in the form of a map, can be displayed on the device 3, by means of which visual information the vehicle user 2 is informed in which direction he has to move in order to make possible the parking operation.

After the vehicle user 2 has changed his position, the vehicle 1 is subsequently moved to the final vehicle target position (S54). This can, in turn, be effected either directly or following an input (e.g. "Start parking operation") by the vehicle user 2 at the device 3. The position of the vehicle user 2 is, in turn, monitored in order to ensure that the latter does not move into the planned vehicle motion path. In the event that the latter does move into the vehicle motion path, the parking maneuver is interrupted or respectively a warning signal is emitted by the vehicle 1.

The parking assistance system preferably has means for identifying a situation in which the vehicle user 2 would be trapped in the parking space if the vehicle 1 were to be brought into the parking position. This can be the case, for example, in garages which have demarcations or respectively walls on three sides. Perpendicular parking situations, in which one side (for example the front narrow side of the parking space) is delimited by a wall or similar and the parking space is delimited laterally by parking cars, are another example.

In the event that the vehicle 1 were to be maneuvered by means of the parking assistance system into such a parking space, the vehicle user 2 would be trapped in the parking space. In order to avoid this, the parking assistance system can be configured to capture parking situations in which the parking space is delimited on three sides in such a way that the vehicle user 2 would no longer be able to leave the parking space following completion of the parking operation.

In the event that the parking assistance system identifies such a parking situation, the parking operation can be interrupted or respectively completed before the parking space so that the vehicle 1 is positioned at a distance (for example 0.5 m, 1 m or 1.5 m) before the parking space. The vehicle user 2 can subsequently be prompted to leave the parking space.

This can be effected, for example, by audible or visual signals of the vehicle 1 itself or by audible or visual notices on the device 3. As a result, "blocking" of the vehicle user 2 in the parking space can be effectively avoided.

The invention has been described above with reference to exemplary embodiments. It is understood that numerous alterations as well as modifications are possible, without departing from the scope of protection defined by the claims.

LIST OF REFERENCE NUMERALS

1 Vehicle
2 Vehicle user
3 Device
4 Parking assistance system
4.1 Control unit
4.2 Surroundings capturing sensor technology
4.3 Location of vehicle user capturing sensor technology
CMP Changed vehicle motion path
CTP Changed vehicle target position
RW Roadway
VSP Vehicle starting position
S Signal
PMP Provisional vehicle motion path
PTP Provisional vehicle target position

The invention claimed is:

1. A method of controlling a parking operation of a vehicle by a parking assistance system, comprising the steps:
   a) capturing a position of a vehicle user who is located close to but outside of the vehicle;
   b) determining a provisional target position and a provisional motion path for the vehicle, based on a vehicle starting position and the position of the vehicle user;
   c) checking whether the provisional target position and/or a motion of the vehicle into the provisional target position along the provisional motion path would cause a collision of the vehicle with the vehicle user;
   d) when a result of the checking in the step c) is affirmative, then changing the provisional target position into a changed target position and/or changing the provisional motion path into a changed motion path so that no collision of the vehicle with the vehicle user will occur at the changed target position and/or along the changed motion path; and
   e) adjusting the provisional target position or the changed target position so that, following the motion of the vehicle into the provisional target position or the changed target position, a driver's door of the vehicle is located in a close spatial relationship with the position of the vehicle user.

2. The method according to claim 1, wherein the changing of the provisional target position into the changed target position comprises changing the provisional target position in at least one spatial direction.

3. The method according to claim 1, wherein the adjusting of the provisional target position or the changed target position takes account of a parking trajectory on which the vehicle moves during the parking operation.

4. The method according to claim 1, further comprising monitoring the position of the vehicle user during the parking operation.

5. The method according to claim 1, further comprising adjusting a speed of the vehicle during the parking operation as a function of a distance between the vehicle and the vehicle user.

6. The method according to claim 1, further comprising displaying, on a device associated with the vehicle user, visual information regarding in which direction and/or how far the vehicle user should move.

7. The method according to claim 1, further comprising determining at least two of the provisional target positions, and enabling the vehicle user to select, on a device associated with the vehicle user, one of the provisional target positions to be used as the provisional target position in the steps c), d) and e).

8. The method according to claim 7, wherein the selected provisional target position is graphically highlighted on the device.

9. The method according to claim 1, wherein the capturing of the position of the vehicle user comprises establishing a position of a device associated with the vehicle user, wherein the device is a vehicle key, a vehicle operating card or a mobile telecommunication device.

10. The method according to claim 1, further comprising identifying a parking in which the vehicle user can not leave a parking space after the vehicle has moved to the parking space at the provisional target position or the changed target position.

11. The method according to claim 10, further comprising interrupting the parking operation prior to moving the vehicle into the parking space, and prompting the vehicle user to leave the parking space, when the parking situation in which the vehicle user can not leave the parking space is identified.

12. The method according to claim 1, wherein the close spatial relationship is a distance of less than 2 m.

13. The method according to claim 1, wherein the close spatial relationship is a distance of less than 1 m.

14. The method according to claim 1, wherein the changing of the provisional target position into the changed target position comprises changing the provisional target position in two different spatial directions.

15. A vehicle comprising a parking assistance system, first sensor technology configured to capture surroundings information, second sensor technology configured to capture a position of a device associated with a vehicle user, and at least one control unit configured to control the parking assistance system and to carry out the steps:
   a) capturing a position of the vehicle user who is located close to but outside of the vehicle;
   b) determining a provisional target position for the vehicle and a provisional motion path for the vehicle, based on a vehicle starting position and the position of the vehicle user;
   c) checking whether the provisional target position and/or a motion of the vehicle into the provisional target position along the provisional motion path would cause a collision of the vehicle with the vehicle user;
   d) when a result of the checking in the step c) is affirmative, then changing the provisional target position into a changed target position and/or changing the provisional motion path into a changed motion path so that no collision of the vehicle with the vehicle user will occur at the changed target position and/or along the changed motion path; and
   e) adjusting the provisional target position or the changed target position so that, following the motion of the vehicle into the provisional target position or the changed target position, a driver's door of the vehicle is located in a close spatial relationship with the position of the vehicle user.

16. A method of controlling a parking operation of a vehicle by a parking assistance system, comprising the steps:
   a) capturing a position of a vehicle user who is located close to but outside of the vehicle;

b) determining a provisional target position for the vehicle and a provisional motion path for the vehicle, based on a vehicle starting position and the position of the vehicle user;
c) checking whether the provisional target position and/or a motion of the vehicle into the provisional target position along the provisional motion path would cause a collision of the vehicle with the vehicle user;
d) when a result of the checking in the step c) is affirmative, then changing the provisional target position into a changed target position and/or changing the provisional motion path into a changed motion path so that no collision of the vehicle with the vehicle user will occur at the changed target position and/or along the changed motion path; and
e) emitting a signal from the vehicle and/or transmitting hint information to a device associated with the vehicle user, wherein the signal and/or the hint information informs the vehicle user that the vehicle user must change the position of the vehicle user to make possible a parking operation when it is not possible to establish the changed target position and/or the changed motion path that will not cause the collision of the vehicle with the vehicle user at a current value of the position of the vehicle user, and then performing the steps a) to d) with respect to a changed value of the position of the vehicle user.

17. The method according to claim 16, wherein the signal and/or the hint information comprises visual information regarding in which direction and/or how far the vehicle user should move for the change of the position of the vehicle user, and further comprising displaying the visual information on the device associated with the vehicle user.

* * * * *